US009360614B2

(12) United States Patent
Lee et al.

(10) Patent No.: US 9,360,614 B2
(45) Date of Patent: Jun. 7, 2016

(54) QUANTUM DOT BAR CONTAINER AND BACKLIGHT UNIT INCLUDING THE SAME

(71) Applicant: Samsung Display Co., Ltd., Yongin, Gyeonggi-Do (KR)

(72) Inventors: Dong Hyeon Lee, Seoul (KR); So Jeong La, Suwon-si (KR); Cheol Yong Noh, Asan-si (KR); Jun Woo You, Seongnam-si (KR); Lu Ly Lee, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/480,498

(22) Filed: Sep. 8, 2014

(65) Prior Publication Data

US 2015/0219822 A1   Aug. 6, 2015

(30) Foreign Application Priority Data

Feb. 5, 2014  (KR) ........................ 10-2014-0013123

(51) Int. Cl.
*F21V 8/00*        (2006.01)
*G02F 1/1335*      (2006.01)
*F21K 99/00*       (2016.01)
*F21V 15/01*       (2006.01)

(52) U.S. Cl.
CPC ................ *G02B 6/0026* (2013.01); *F21K 9/56* (2013.01); *F21V 15/01* (2013.01); *G02B 6/0088* (2013.01); *G02F 1/1336* (2013.01)

(58) Field of Classification Search
CPC ......... F21K 9/56; F21V 15/01; G02B 6/0026; G02B 6/0088; G02F 1/1336
See application file for complete search history.

(56) References Cited

U.S. PATENT DOCUMENTS

| 8,783,930 | B2 * | 7/2014 | Park | G02B 6/0068 349/61 |
| 9,074,748 | B2 * | 7/2015 | Yang | G02B 6/42 |
| 9,121,977 | B2 * | 9/2015 | Park | G02F 1/133615 |
| 2011/0141769 | A1 * | 6/2011 | Lee | G02B 6/0023 362/629 |
| 2013/0050612 | A1 | 2/2013 | Hur et al. | |
| 2013/0329161 | A1 * | 12/2013 | Park | G02F 1/133615 349/58 |
| 2014/0036532 | A1 * | 2/2014 | Lee | G02B 6/0023 362/608 |
| 2014/0133129 | A1 * | 5/2014 | Roh | B82Y 20/00 362/84 |
| 2014/0160789 | A1 * | 6/2014 | Park | G02B 6/0023 362/608 |

FOREIGN PATENT DOCUMENTS

| JP | 11-095214 | 4/1999 |
| JP | 2010-091742 | 4/2010 |
| JP | 2010-145650 A | 7/2010 |
| KR | 10-1997-0028699 | 6/1997 |
| KR | 10-2011-0012246 A | 2/2011 |
| KR | 10-2011-0044002 A | 4/2011 |
| KR | 10-2012-0068499 A | 6/2012 |
| KR | 10-2012-0075142 A | 7/2012 |

* cited by examiner

*Primary Examiner* — Thomas A Hollweg
(74) *Attorney, Agent, or Firm* — INNOVATION COUNSEL LLP

(57) ABSTRACT

Provided are quantum dot bar container and backlight unit. According to an aspect of the present invention, there is provided a quantum dot bar container comprising a support including a guide groove formed along a major axis thereof; a cover having a major axis, the cover being orientable to align its major axis substantially parallel to the major axis of the support, the cover including a fixing groove formed along the major axis of the cover so as to face the guide groove; and a fixing portion coupling an end of the support to an end of the cover. The cover and the support are positioned so as to form a window therebetween, when the cover is oriented so that its major axis is substantially parallel to the major axis of the support.

20 Claims, 25 Drawing Sheets

QUANTUM DOT BAR CONTAINER AND BACKLIGHT UNIT INCLUDING THE SAME

CROSS-REFERENCE TO RELATED APPLICATIONS

This application claims priority to, and the benefit of Korean Patent Application No. 10-2014-0013123 filed on Feb. 5, 2014 in the Korean Intellectual Property Office, the disclosure of which is incorporated herein in its entirety by reference.

BACKGROUND

1. Field of the Invention

Embodiments of the present invention relate generally to flat panel displays. More specifically, embodiments of the present invention relate to a backlight unit and a liquid crystal display including the same.

2. Description of the Prior Art

A liquid crystal display is currently one popular information display technology. The liquid crystal display displays information by employing liquid crystals, which are inserted between two glass substrates, and which emit light through application of power to electrodes positioned on upper and lower portions of the glass substrates.

The liquid crystal display is a light receiving device which is not self-luminous and thus displays an image through adjustment of permeability of light that is input from an external source, and thus requires a separate device for irradiating its liquid crystal panel with light. This is typically a backlight unit.

Recently, a light emitting diode (LED) array has been employed as a light source for a backlight unit of a liquid crystal display. The LED is a semiconductor light emitting element that emits light when current flows through the LED. Since the LED has the advantages of long lifespan, low power consumption, rapid response speed, and superior initial driving characteristics, it has been widely used as an illumination device, a billboard, and a backlight unit of a display device, and its application fields have been gradually extended.

In the case of using an LED light source, quantum dots are used to heighten color purity. The quantum dots emit light as unsteady electrons are transited from a conduction band to a valence band, and have the characteristics that wavelengths of emitted light differ depending on the size of particles used, even if those particles are all made of the same material. Since the quantum dots generate light of shorter wavelength as the size of the quantum dots becomes smaller, light of a desired wavelength range can be obtained through adjustment of the size of the quantum dots.

Accordingly, recent efforts have focused on implementation of white light having wide color gamut from light generated from an LED using quantum dots.

SUMMARY

Embodiments of the invention provide a quantum dot bar container which has a superior external appearance and can be more easily assembled.

Embodiments of the invention also provide a quantum dot bar container which can prevent damage of a quantum dot bar due to expansion of a light guide plate.

Embodiments of the invention further provide a quantum dot bar container which can prevent distortion of luminance through the whole surface of a backlight unit and can implement white light having a wider color gamut.

Additional advantages, subjects, and features of embodiments of the invention will be set forth in part in the description which follows and in part will become apparent to those having ordinary skill in the art upon examination of the following or may be learned from practice of the invention.

In one aspect of the present invention, there is provided a quantum dot bar container, which includes a support including a guide groove formed along a major axis thereof; a cover having a major axis, the cover being orientable to align its major axis substantially parallel to the major axis of the support, the cover including a fixing groove formed along the major axis of the cover so as to face the guide groove; and a fixing portion coupling an end of the support to an end of the cover. The cover and the support are positioned so as to form a window therebetween, when the cover is oriented so that its major axis is substantially parallel to the major axis of the support. The cover is connected to at least one end of the support by a hinge.

The fixing portion may comprise a band cap having an empty space formed therein.

The fixing portion may comprise a hook.

The fixing portion may comprise an elastic projection and a hole positioned and sized to accommodate the elastic projection therein.

The cover may include a base for separating the support and the cover from each other, and the base may extend from the cover toward the support.

The base may include a curved surface extending toward the support.

The quantum dot bar container according to the aspect of the present invention may further include an angle maintenance portion formed between the base and the support and positioned to contact the base so as to maintain an open state of the cover.

The support may further include a stopper positioned proximate to the guide groove and extending from a surface of the support.

The support may further include a fixture projecting from a surface that is opposite to the surface from which the guide groove extends.

In another aspect of the present invention, there is provided a quantum dot bar container, which includes a support including a guide groove formed along a major axis thereof; a first cover and a second cover each having a major axis, each cover being orientable to align its major axis substantially parallel to the major axis of the support, each cover including a fixing groove formed along the major axis of its cover so as to face the guide groove; and fixing portions coupling the first and second covers to each other when the first and second covers are oriented so that their major axes are substantially parallel to the major axis of the support. The first and second covers and the support are positioned so as to form a window between the covers and the support, when the covers are oriented so that their major axes are substantially parallel to the major axis of the support. The cover is connected to at least one end of the support by a hinge.

The fixing portion may engage the first cover and the second cover are shaped and positioned to engage each other through a concavo-convex engagement.

The fixing portions may couple the first cover to the second cover according to an engagement of an elastic projection with a hole sized and positioned to accommodate the elastic projection therein.

The first cover and the second cover may include a first base and a second base for separating the first and second covers from the support, and the first base and the second base may each extend toward the support.

The quantum dot bar container according to the aspect of the present invention may further include a first angle maintenance portion and a second angle maintenance portion formed between the first and second bases and the support and positioned to contact their respective bases to maintain open states of the first cover and the second cover.

In still another aspect of the present invention, there is provided a backlight unit, which includes a light source; a light guide plate configured to guide light from the light source to a front liquid crystal panel; a quantum dot bar arranged between the light source and the light guide plate to convert light from the light source into white light; and a quantum dot bar container accommodating the quantum dot bar and supporting a surface of the light guide plate. The quantum dot bar container includes a support and a cover arranged to face each other, and a fixing portion coupling the support to the cover, the support and the cover including grooves shaped to accommodate an outer surface of the quantum dot bar, wherein the cover is connected to at least one end of the support by a hinge.

The backlight unit according to the aspect of the present invention may further include a lower chassis accommodating the light source, the light guide plate, the quantum dot bar, and the quantum dot bar container, wherein the lower chassis includes a seat portion seating the light guide plate at a height substantially equal to a height of the support.

The support may include a fixture extending between the support and the lower chassis, wherein the lower chassis includes a fastening hole accommodating and fastening the fixture.

The lower chassis may include a plurality of fastening holes that are arranged to be spaced apart from each other.

The backlight unit according to the aspect of the present invention may further include light guide plate guide portions extending from the support, wherein one of the light guide plate guide portions is positioned proximate to a first end of the light guide plate, and the other one of the light guide plate portions is positioned proximate to a second end of the light guide plate, the first end of the light guide plate being opposite to the second end of the light guide plate.

The light source and the quantum dot bar may be arranged to be spaced apart from each other.

According to the aspects of the present invention, at least the following effects can be achieved.

That is, the quantum dot bar container can be provided which has a superior external appearance, is easily assembled, and shows uniform luminance over the whole surface of the backlight unit.

Further, the quantum dot bar container and the backlight unit can be provided which can prevent the quantum dot bar from being damaged due to the expansion of the light guide plate and which also has superior durability.

The effects according to the present invention are not limited to the contents as exemplified above, but further various effects are included in the description.

BRIEF DESCRIPTION OF THE DRAWINGS

The above and other objects, features and advantages of the present invention will be more apparent from the following detailed description taken in conjunction with the accompanying drawings, in which.

Figure 1:
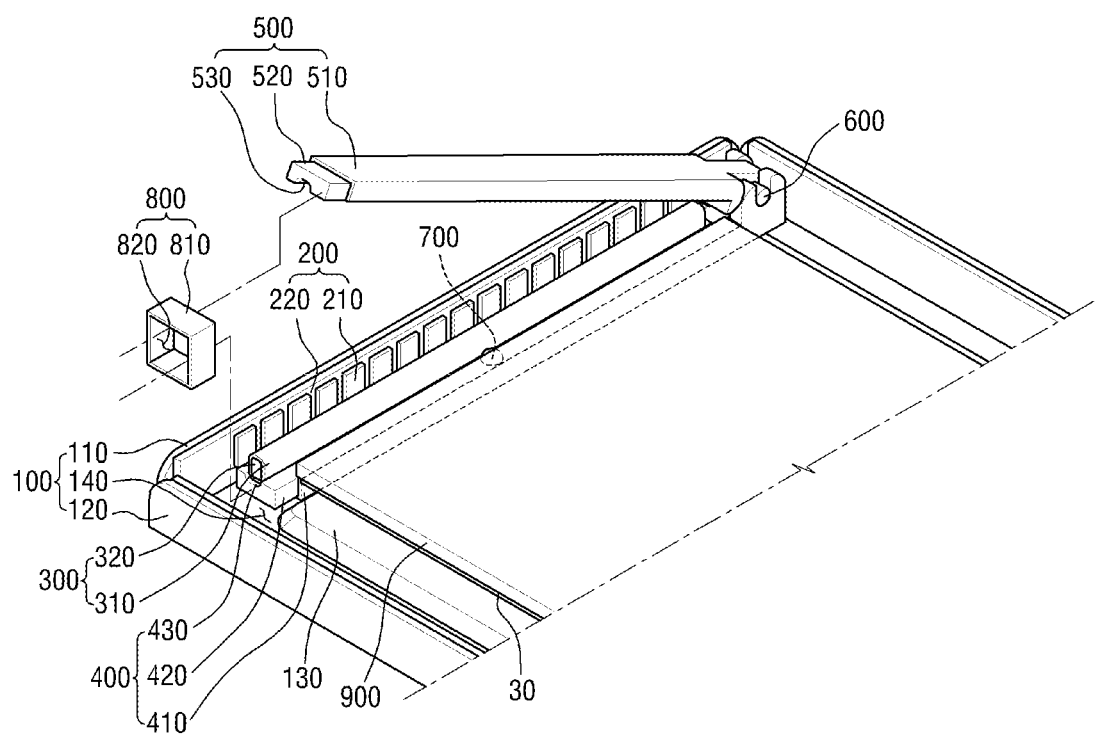
FIG. 1 is a perspective view of a backlight unit according to an embodiment of the present invention.
Figure 2:
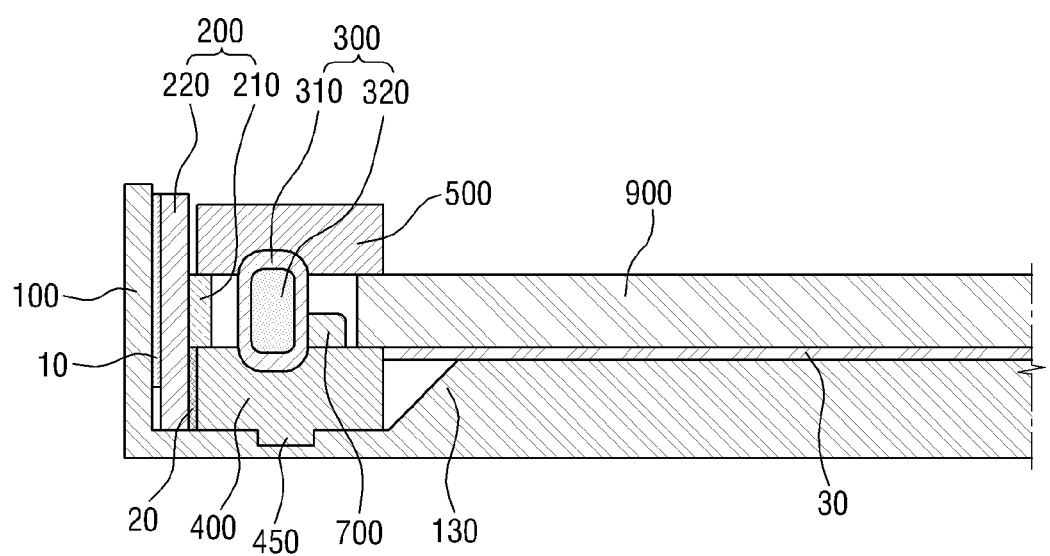
FIG. 2 is a cross-sectional view of a backlight unit according to an embodiment of the present invention before a fixing portion is adopted.
Figure 3:
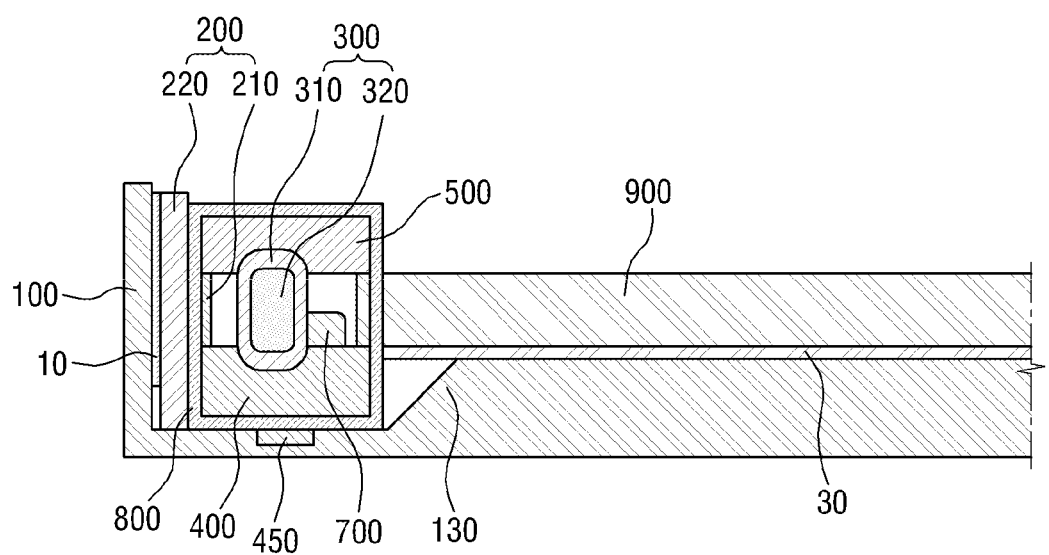
FIG. 3 is a cross-sectional view of a backlight unit according to an embodiment of the present invention after a fixing portion is adopted.
Figure 4:
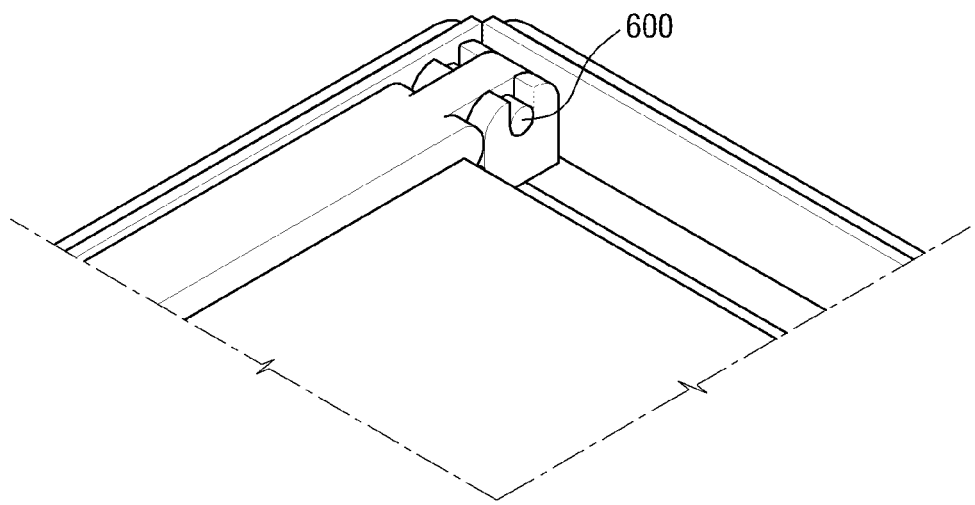
FIG. 4 is an enlarged perspective view of a hinge-engaged portion of FIG. 1.

The various figures are not to scale.

DETAILED DESCRIPTION OF THE EMBODIMENTS

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same reference numerals are used for the same elements across various figures. In the drawings, sizes and relative sizes of layers and areas may be exaggerated for clarity in explanation.

The term "on" that is used to designate that an element is on another element located on a different layer or a layer includes both a case where an element is located directly on another element or a layer and a case where an element is located on another element via another layer or still another element.

Although the terms "first, second, and so forth" are used to describe diverse constituent elements, such constituent elements are not limited by the terms. The terms are used only to discriminate a constituent element from another constituent element. Accordingly, in the following description, a first constituent element may be a second constituent element.

Hereinafter, embodiments of the present invention will be described with reference to the accompanying drawings.

FIG. 1 is a perspective view of a backlight unit according to an embodiment of the present invention.

Referring to FIGS. 1 to 4, a backlight unit may include a lower chassis 100, a light source 200, a quantum dot bar 300, a light guide plate 900, and a quantum dot bar container having a support 400 and a cover 500. The lower chassis 100 may further include a bottom portion 140, a plurality of side wall portions 110 and 120 that surround the bottom portion 140, and a seat portion 130 seating the light guide plate 900 thereon.

The light source 200 may be arranged between one side wall portion 110 of the lower chassis 100 and the light guide plate 900. The light source 200 may include one or more LEDs 210 that are mounted on a printed circuit board 220, and may be attached to one side wall portion 110 of the lower chassis 100 and a rear surface of the printed circuit board 220 of the light source 200 using heat-resistant tape, resin, or urethane.

Each LED 210 may be, as nonlimiting examples, a blue LED or a UV LED. The LEDs 210 may be mounted on the printed circuit board 220 and may emit light through reception of a driving signal input thereto. A plurality of LEDs 210 may be arranged along the side wall portion 110.

The quantum dot bar 300 may convert the wavelength of light that is incident from the light source and may emit white light. The quantum dot bar 300 may include a quantum dot accommodation tube 310 that is made of glass or transparent polymer materials and a mixture of a polymer material, and may also include a quantum dot material 320 which fills and seals the quantum dot accommodation tube 310.

The quantum dot material 320 emits light as unsteady electrons transition from a conduction band to a valence band, and have the characteristics that wavelengths of the emitted light differ depending on the size of particles, even if the particles are of the same material. Since the quantum dot material generates light of shorter wavelength as the size of the quantum dot becomes smaller, light of a desired wavelength range can be obtained through adjustment of the size of the quantum dot.

The quantum dot material 320 has a particle size that is equal to or smaller than 10 nm. For example, if the particle size of the quantum dot material 320 is 55 to 65 Å, the quantum dot material may emit red-series light, and if the particle size is 40 to 50 Å, the quantum dot material may emit green-series light. If the particle size is 20 to 35 Å, the quantum dot material may emit blue-series material. The quantum dot material that emits yellow light may have a particle size that is in the middle between the particle sizes of the quantum dot materials that respectively emit red light and green light.

In order to form a quantum dot bar that emits white light in the case where the light source is a UV LED, three kinds of quantum dots, which receive light of a UV wavelength and emit red light, blue light, and green light, respectively, may be mixed. If the light source is a blue LED, two kinds of quantum dots, which receive light of a blue color wavelength and emit red light and blue light, respectively, may be mixed.

The quantum dot material 320 may include any one of Si nanocrystal, II-IV group compound semiconductor nanocrystal, III-V group compound semiconductor nanocrystal, IV-VI group compound nanocrystal, and any mixture or other combination thereof.

The II-VI group compound semiconductor nanocrystal may be any one selected from the group including CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

Further, the III-V group compound semiconductor nanocrystal may be any one selected from the group including GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs.

The IV-VI group compound semiconductor nanocrystal may be SbTe.

The quantum dot bar 300 may be accommodated in a quantum dot bar container, and the quantum dot bar container may have a structure in which the support 400 (including a guide groove 430) and the cover 500 (including a fixing groove 530) are hinge-engaged with each other via a hinge 600. The quantum dot bar 300 may be seated in the guide groove 430 and may be fixed by the fixing groove 530 of the cover 500. When the cover 500 is closed, the quantum dot bar 300 may be interposed between, and thus securably affixed by, the support 400 and the cover 500.

The quantum dot bar container may include a fixing portion 800 fixing the support 400 and the cover 500, and the fixing portion 800 may be formed on a surface that is opposite to the hinge engagement 600 based on a long axis of the support 400. The fixing portion 800 may have a band-shaped band cap 810 in which an empty space 820 that corresponds to sectional shapes of an end 420 of the support and an end 520 of the cover is formed. The fixing portion 800 thus slides over the ends 420 and 500 and contains them within the empty space 820 so as to secure the two ends 420, 520 together.

The quantum dot bar 300 is shaped generally as a long tube in which the quantum dot material 320 fills the inside of the glass tube 310, and thus it may be easily broken. In particular, the quantum dot material may include a pollutant material, such as Cd, and if the quantum dot bar is broken, it may cause a problem to occur in the product or may pollute the environment. Accordingly, the quantum dot bar 300 can be prevented from being broken by simply seating the quantum dot bar 300 in the guide groove 430 of the support 400 and closing the cover 500 to accommodate the quantum dot bar 300 therein. The quantum dot bar container will be described in more detail later.

The light guide plate 900 may be arranged on the bottom surface 140 of the lower chassis 100 and may be placed on the support 400 of the quantum dot bar container. Accordingly, light that is emitted from the light source 200 may pass through the quantum dot bar 300 that is placed in the quantum dot bar container, and the resultant white light that is emitted by the quantum dot bar 300 may be incident to the side surface of the light guide plate 900 that is placed on the support 400, so as to be directed to the liquid crystal panel that is positioned on the upper surface of the light guide plate 900.

The light guide plate 900 may direct the incident light toward the liquid crystal panel through reflection, refraction, and scattering of the incident light, and may be made of polymethylmethacrylate resin, polycarbonate resin, acrylonitrile-styrene-butadiene copolymer resin, polystyrene resin, acrylonitrile-styrene copolymer resin, polyolefin resin, or polymethacrylstyrene resin in which polymethylmethacrylate and polystyrene are mixed. Any other material or combination of materials is also contemplated. According to circumstances, the light guide plate may have a wedge shape in which the thickness of the light guide plate decreases as the distance from the light source increases, or have in a platelike shape in which upper and lower surfaces thereof are substantially parallel to each other. The shape of the light guide plate can be appropriately modified by those of ordinary skill in the art according to circumstances.

The bottom surface 140 of the lower chassis 100 may include the seat portion 130 for seating the light guide plate 900 thereon, and the seat portion 130 may include a convex shape that projects from the bottom surface 140 toward the lower surface of the light guide plate. The height of the projection of the seat portion 130 may be at least approximately equal to the height of the upper surface of the support 400, so that the light guide plate 900 can be positioned at least approximately along the same parallel line as the light source 200 and the quantum dot bar 300, and the light guide plate 900 can be stably placed on the seat portion 130 and the support 400.

The support 400 may include a stopper 700 that prevents the light guide plate 900 from coming in contact with the quantum dot bar 300 and damaging the quantum dot bar 300. The stopper 700 may be formed to project from the side surface on which the light guide plate 900 is placed based on the guide groove 430. The light guide plate 900 and the quantum dot bar 300 can thus be prevented from coming in physical contact with each other via the stopper 700.

The support 400 may include a fixture 450 that is provided on the opposite surface on which the stopper 700 is formed, that is, between the support 400 and the bottom surface 140 of the lower chassis 100, to fix the support 400. The fixture 450 may be engaged with and fixed to a hole or groove that is formed on the lower chassis. The fixture 450 may have a protrusion shape that projects to extend in the length direction of the long axis of the support 400.

In order to fix the support 400, a double-side tape 20 may be adhered to the side surface of the support 400 and the portion of the printed circuit board where the LED is not formed.

The light source 200 and the quantum dot bar 300 may be arranged to be spaced apart from each other by a predetermined distance so as to prevent the quantum dot bar 300 from being deteriorated and damaged due to heat generated by the light source 200.

The support 400 may be made of polycarbonate (PC) resin, a mixture of polycarbonate resin and acrylonitrile-butadiene-styrene copolymer resin, or a mixture of polycarbonate resin and glass fiber (GIF). Any other suitable materials are also contemplated. Further, the cover 500 and the stopper 700 may be made of the same material as the support 400, and may have elasticity to pressably fix the light guide plate 900 and the quantum dot bar 300 with a predetermined pressure.

If the support 400, the cover 500, and the stopper 700 are made of the same material, the light that is reflected by the support 400, the cover 500, and the stopper 700 in the quantum dot bar container may have the same reflection rate, and thus light may be substantially uniformly reflected toward the light guide plate 900. Accordingly, light distortion can be prevented from occurring. For example, if the stopper 700 were formed of a metal material, the stopper 700 would have reflection rate that is different from the reflection rate of the support 400 and the cover 500, causing luminance to be concentrated in a specific region and a dark space to occur in another specific region. Accordingly, if the support 400, the cover 500, and the stopper 700 are made of the same material, light distortion can be prevented or reduced.

A reflection sheet 30 may be further provided on the rear surface of the light guide plate 900, that is, between the light guide plate 900 and the bottom surface 140 of the lower chassis 100. The reflection sheet 30 may reflect light which is emitted to the rear surface of the light guide plate 900 back toward the front surface of the light guide plate 900, so as to heighten light efficiency.

Figure 5:
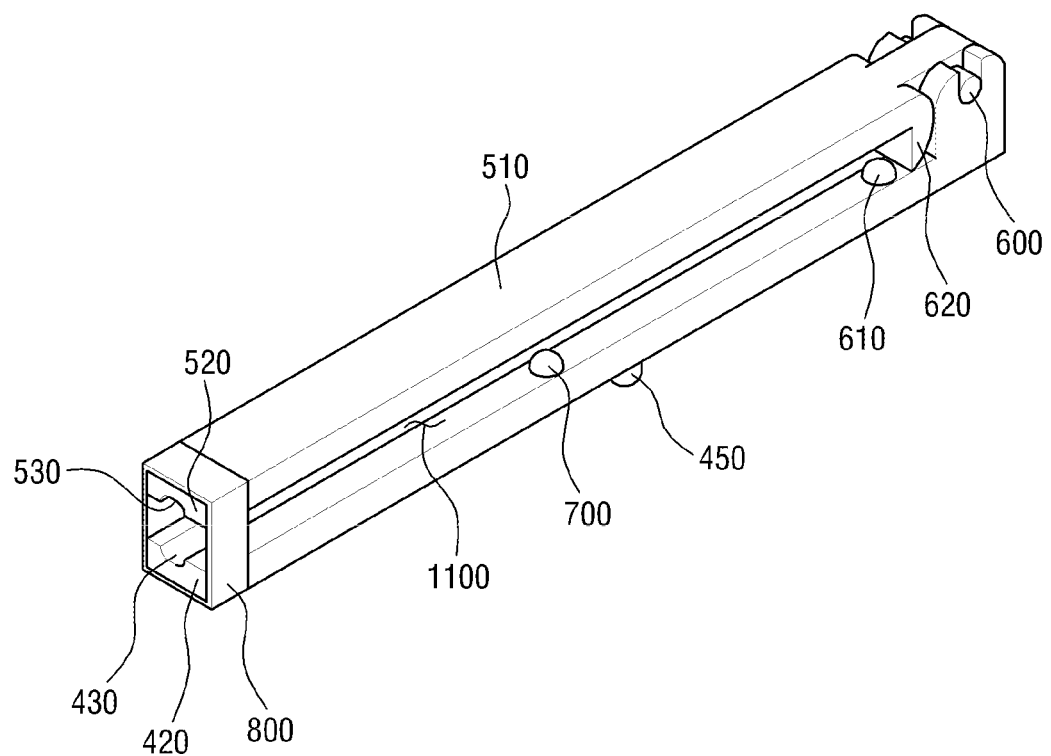
FIG. 5 is a perspective view of a quantum dot bar container according to an embodiment of the present invention.
Figure 6:
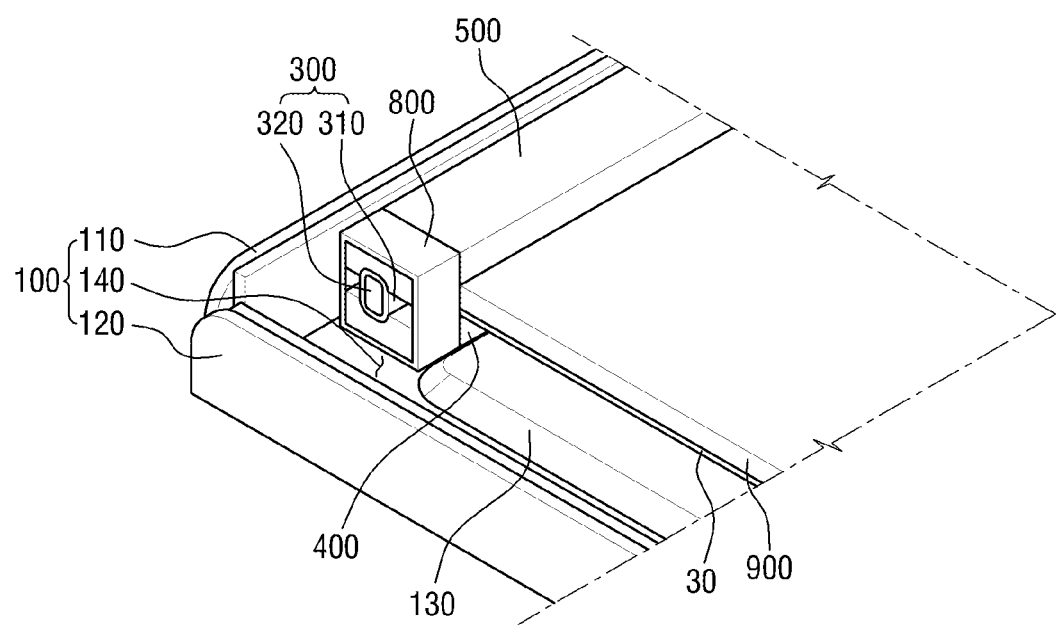
FIG. 6 is a perspective view of a backlight unit including the quantum dot bar container of FIG. 5.

Referring to FIGS. 5 and 6, the quantum dot bar container according to an embodiment of the present invention will be further described. The quantum dot bar container may include a support 400 including a guide groove 430 formed along a long axis of the support 400, and a cover 500 having a long axis that is arranged to face the support 400, to extend along the same direction, and to include a fixing groove 530 formed thereon to face the guide groove 430 and to extend along the long axis. Thus, the quantum dot bar container may have a light incident window (not illustrated) and a light emission window 1100 formed between the support 400 and the cover 500. A fixing portion 800 fixes the support 400 and the cover 500 together at any one end thereof in the long axis direction of the support 400 and the cover 500, wherein the cover 500 may be hinge-engaged at an end thereof that is opposite to the end at which the fixing portion 800 is formed.

The support 400 and the cover 500 may include the long axis and a short axis, and may be, for example, form a long bar shape when the cover 3 is closed. The support 400 and the cover 500 may be arranged to face each other so that the long axis direction and the short axis direction are respectively the same. The support 400 may include the guide groove 430 that is formed along the long axis so as to accommodate and support the quantum dot bar, and the guide groove 430 may have a shape that corresponds to the shape of (i.e. conforms to the outer surface of) the quantum dot bar. For example, if the sectional shape of the quantum dot bar is a circular shape, the sectional shape of the guide groove 430 is also a circular intaglio shape. If the sectional shape of the quantum dot bar is a rectangular shape, the sectional shape of the guide groove is also a rectangular intaglio shape.

The cover 500 may include a fixing groove 530 formed along the same direction as the guide groove 430 so as to fix and cover the quantum dot bar when the quantum dot bar is accommodated in the support 400. The sectional shape of the fixing groove 530 may is be an intaglio shape that corresponds to (i.e. conforms to the outer surface of) the shape of the quantum dot bar, similar to the guide groove. Accordingly, an upper portion of the quantum dot bar can be covered by the cover 500 when the quantum dot bar is seated in the guide groove 430 of the support, and since the guide groove 430 and the fixing groove 530 are shaped to correspond to the shape of the quantum dot bar, the quantum dot bar can be stably held within and secured by the quantum dot bar container.

The support 400 and the cover 500 are arranged to be spaced apart from each other, and the light incident window (not illustrated) and the light emission window 1100 may be formed between the long axis of the support 400 and the long axis of the cover 500 to be spaced apart from each other by a predetermined distance. As illustrated in FIG. 6, the light source 200 may be arranged to face the light incident window, and the light guide plate 900 may be placed facing the light emission window 1100. Accordingly, the light that is emitted from the light source is directed to the quantum dot bar 300 through the light incident window, and the white light that is generated by the quantum dot bar 300 is incident to the light guide plate 900 through the light emission window 1100.

The cover 500 is hinge-engaged with the support 400 at any one end of the support 400, and thus the quantum dot bar can be stably accommodated and fixed. More specifically, this is done by placing the quantum dot bar in the guide groove 430 of the support 400 when the cover 500 is open, closing the cover 500, and then fastening and fixing the support 400 and the cover 500 to each other via the fixing portion 800.

The light incident window and the light emission window 1100 may be formed as the support 400 and the cover 500 become spaced apart from each other by the determined distance. The cover 500 may further include a base 620 for maintaining a predetermined space or distance between the support 400 and the cover 500.

Figure 7:
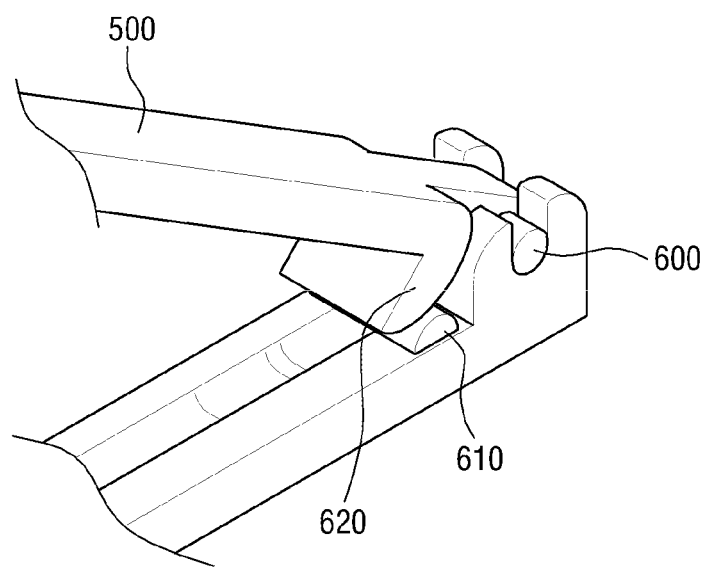
FIG. 7 is an enlarged perspective view of a hinge engagement portion of a quantum dot bar container according to another embodiment of the present invention.

FIG. 7 is an enlarged perspective view of a hinge engagement portion of a quantum dot bar container according to another embodiment of the present invention. As illustrated in FIG. 7, the cover 500 further includes the base 620 to space the support 400 and the cover 500 apart from each other by a predetermined distance. The base 620 may include a shape that is curved and extends from the cover 500 toward the support 400, with a curved surface facing the hinge-engaged portion 600 to space the cover 500 and the support 400 apart from each other when the cover 500 is closed.

Since the base 620 has a curved outer surface that is bent from the cover 500 toward the support 400, the light incident window and the light emission window 1100 can be formed by spacing the cover 500 and the support 400 apart from each other by the predetermined distance when the cover 500 is fixedly closed. Further, since the surface of base 620 which comes in contact with the support 400 is curved or rounded, the cover 500 can be smoothly rotated by the hinge 600 while maintaining a constant gap.

The quantum dot bar container may further include an angle maintenance portion 610 formed to project upward from the support 400 so as to maintain the cover 500 in an open state at a predetermined angle between the base 620 and the support 400. If the cover 500 is opened to accommodate the quantum dot bar, the cover 500 is frictionally maintained at the predetermined angle by the angle maintenance portion 610, and thus the quantum dot bar can be more easily accommodated therein. The angle maintenance portion 610 may have elasticity. Accordingly, if a force is applied to the cover 500 and pressure that is higher than the elastic force of the angle maintenance portion 610 is applied, the base 620 of the cover 500 receives the force that exceeds the elastic force of the angle maintenance portion 610, and thus the cover 500 may be closed over the angle maintenance portion 610.

The support 400 may further include a stopper 700 formed on the upper surface of the support 400 which forms the light emission window along with the lower surface of cover 500, and prevents the quantum dot bar from coming in contact with the light guide plate and from being broken when the light guide plate is seated on the support or the light guide plate is expanded by heat during driving. The stopper 700 is formed near the guide groove 430, although embodiments of the invention are not limited thereto.

Figure 8:
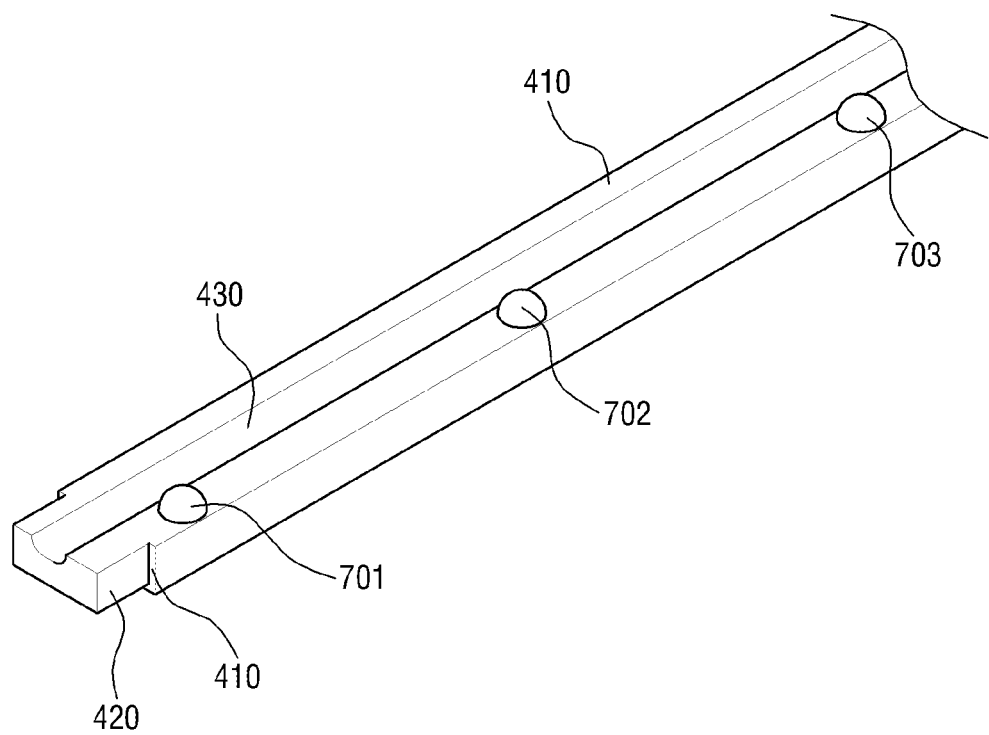
FIG. 8 is a perspective view illustrating a support of a quantum dot bar container according to still another embodiment of the present invention.

FIG. 8 is an enlarged view illustrating a hinge-engaged portion of a quantum dot bar container according to still another embodiment of the present invention. A plurality of stoppers 701, 702, and 703 may be formed to be spaced apart from each other, and although not illustrated in the drawing, the stoppers may be shaped in the form of a cylinder, a rectangular prism, or a triangular prism. The shape of the stopper is not specially limited, though, and may take on any suitable shape.

Referring again to FIG. 5, the support 400 may further include the fixture 450 that projects from the surface that is opposite to the surface on which the guide groove 430 is formed. The fixture 450 may be fastened to a fastening hole that can accommodate and fasten the fixture, so as to be fixed to the lower chassis.

Figure 9:
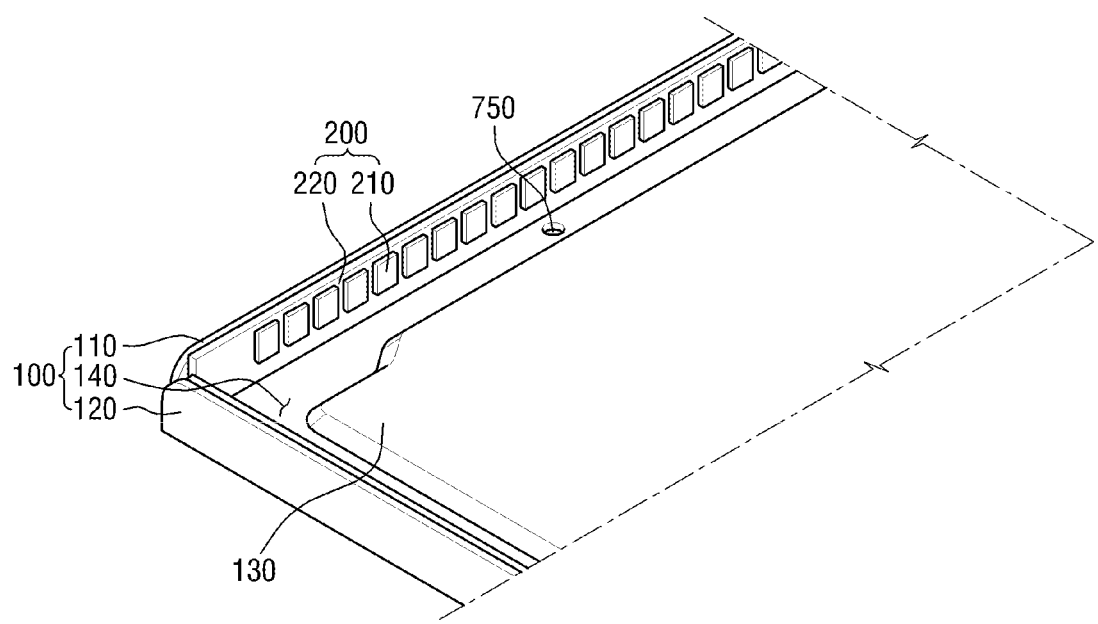
FIG. 9 is a perspective view of a lower chassis according to an embodiment of the present invention.

FIG. 9 is a perspective view of a lower chassis according to an embodiment of the present invention. Referring to FIG. 9, the light source 200 may be arranged on the side wall portion 110 of the lower chassis 100, and a fastening hole 750 may be formed on the bottom surface of the lower chassis 100. The fastening hole 750 is located to correspond to a projection from the support 400, e.g. the fixture 450.

Figure 10:
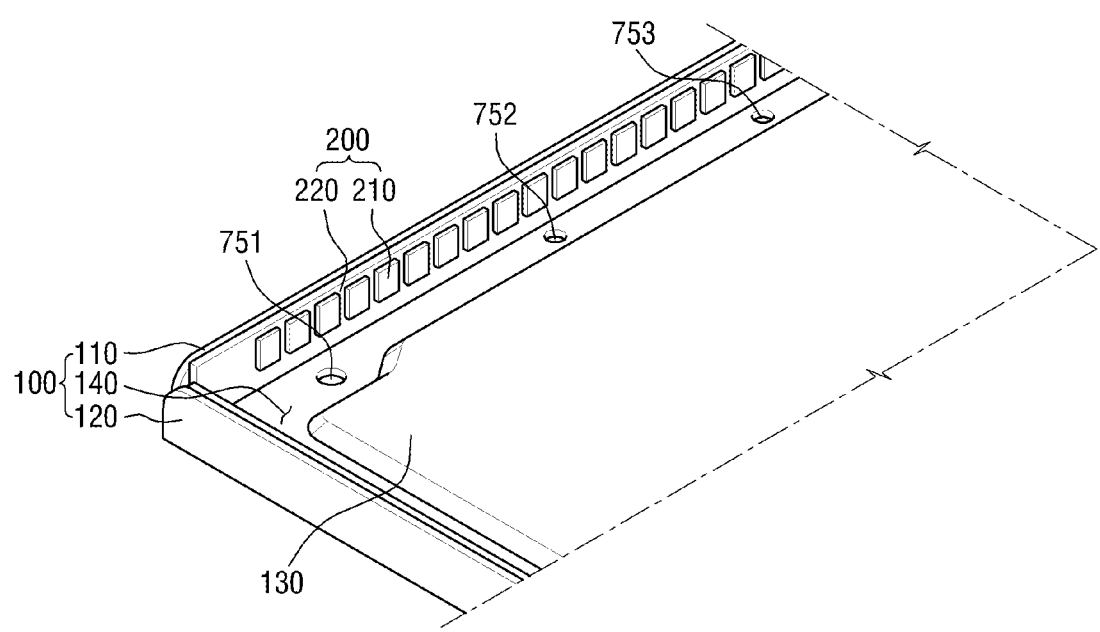
FIG. 10 is a perspective view of a lower chassis according to another embodiment of the present invention.

FIG. 10 is a perspective view of a lower chassis according to another embodiment of the present invention. As illustrated in FIG. 10, a plurality of fastening holes 751, 752, and 753 may be formed on the lower chassis 100 to be spaced apart from each other, and the quantum dot bar container can be fixed to the lower chassis 100 more stably by the plurality of fixtures (such as fixture 450) and fastening holes 751, 752, and 753.

Figure 11:
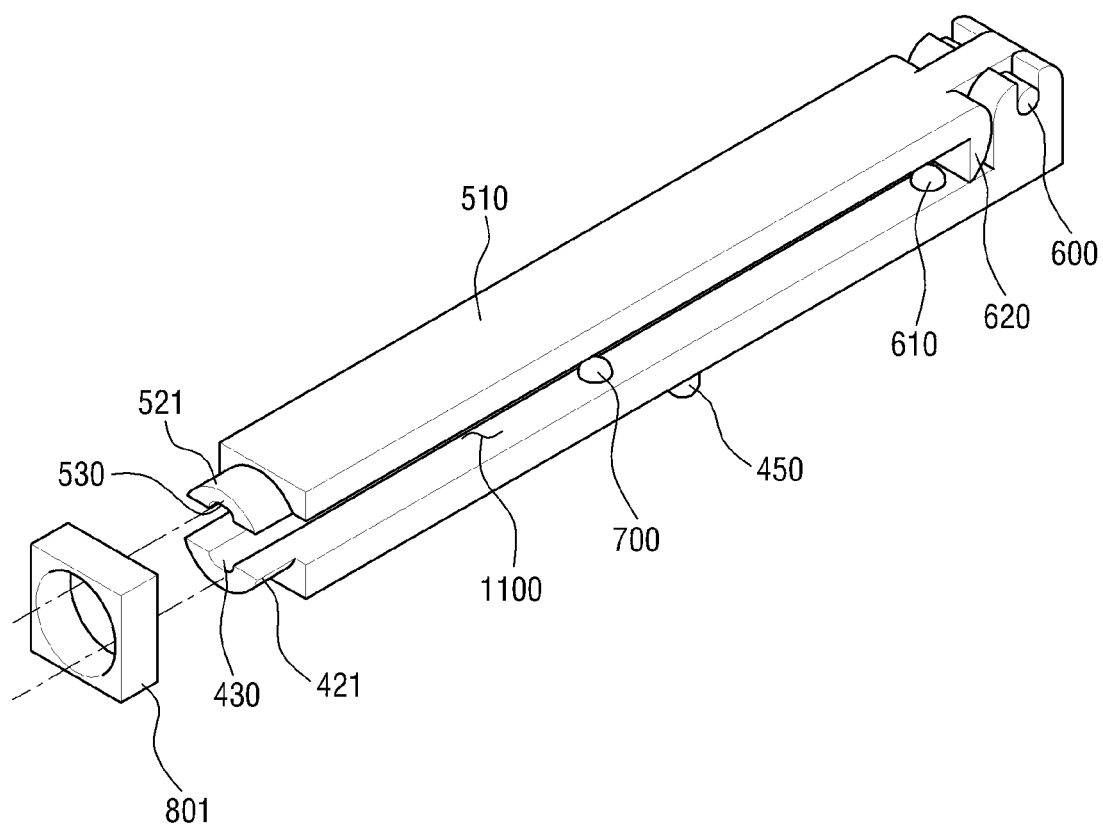
FIG. 11 is a perspective view of a quantum dot bar container according to still another embodiment of the present invention.

Referring again to FIG. 5, the fixing portion 800 may be shaped as a bandlike cap that outlines an empty space that corresponds to the cross-sectional shapes of the support 400 and cover 500. More specifically, the band cap may be shaped and sized to accommodate ends of the support 400 and cover 500 within. In FIG. 5, the band cap has a structure like a "⊐"-shaped band, and the empty space for accommodating the support 400 and the cover 500 is formed within the band. Accordingly, the support and the cover may be inserted into the empty space to be thereby affixed to each other. In order to fix the support 400 and the cover 500 using the band cap, the support 400 and the cover 500 may have different sectional shapes in addition to the above-described sectional shape. For example, as illustrated in FIG. 11, the cross section of the empty space in a band cap 801 may have a circular shape, and the portions of the support and the cover that are fixed by the band cap may be formed to match the shape of the empty space of the band cap 801.

Figure 12:
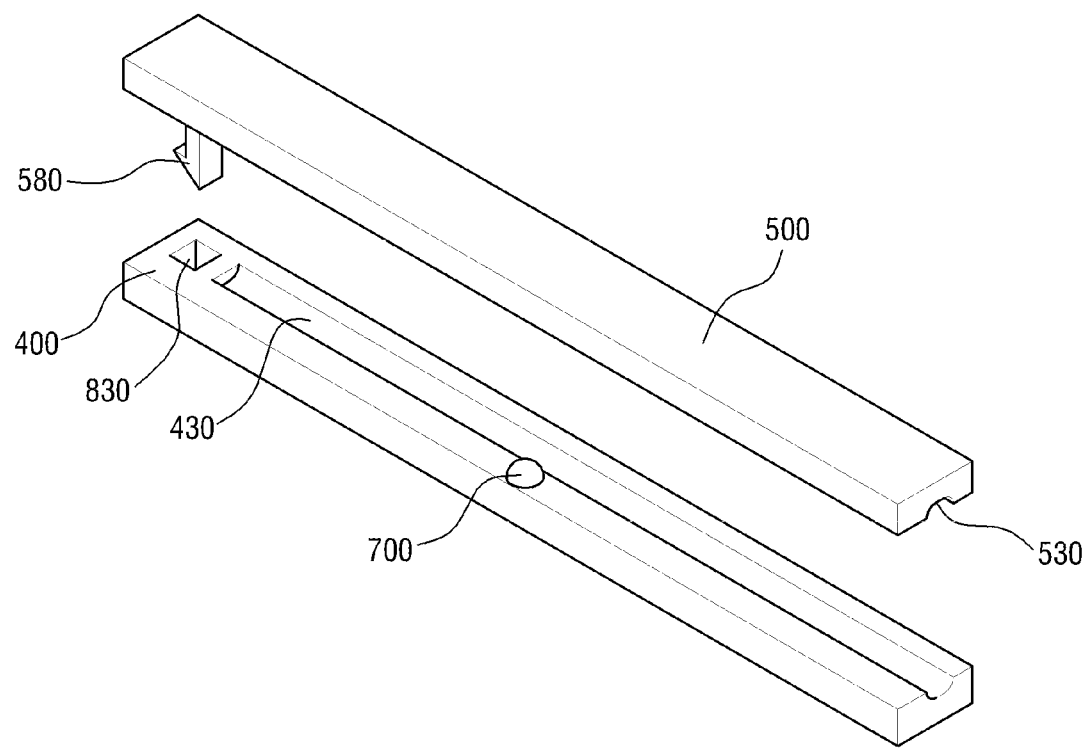
FIG. 12 is a perspective view of a fixing portion of a quantum dot bar container according to still another embodiment of the present invention.

FIG. 12 illustrates a fixing portion of a quantum dot bar container according to still another embodiment of the present invention. As illustrated in FIG. 12, the fixing portion may be hook-engaged by engaging a hook 580 formed on a cover 505 with a hook hole 830 that is formed on the support 400. For the hook-engagement, the hook 580 may be composed of an elastic member. FIG. 12 illustrates that the hook 580 is formed on the cover 500. However, the arrangement of the hook 580 and the hook hole 830 may be modified so that the hook 580 is formed on the support 400 and the hook hole 830 is formed on the cover 500.

Figure 13:
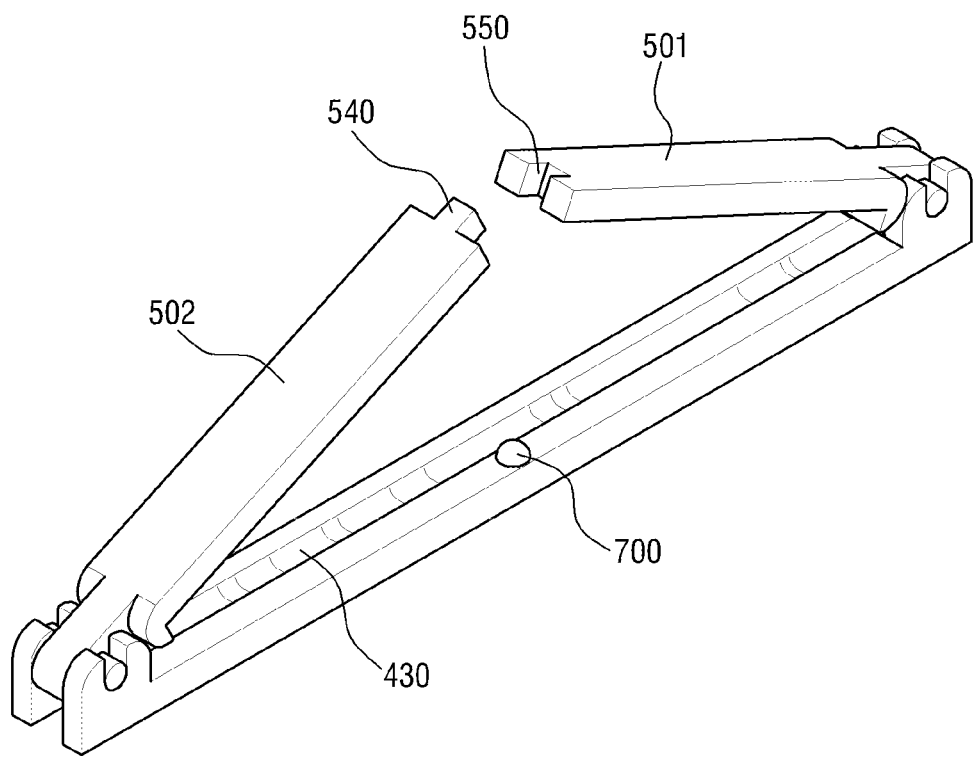
FIG. 13 is a perspective view of a quantum dot bar container according to still another embodiment of the present invention.

Referring to FIG. 13, a quantum dot bar container according to still another embodiment of the present invention will be described. A quantum dot bar container according to this embodiment of the present invention includes a support 400 including a guide groove 430 formed along a long or major axis thereof; a first cover 501 and a second cover 502 coupled to the support in hinged manner and including fixing grooves (not illustrated) formed thereon which face the guide groove 430 when the covers 501, 502 are pivoted parallel to the support 400; an open window formed between the support 400 and the first cover 501 and the second cover 502; and fixing portions 540 and 550 fixing the first cover 501 and the second cover 502 to each other when the first cover 501 and the second cover 502 come in contact with each other, wherein the first cover 501 and the second cover 502 are hinge-engaged 601 and 602 at opposite ends of the support 400.

That is, the first cover 501 may be hinge-engaged 601 with any one end in the long axis direction of the support 400, and the second cover 502 may be hinge-engaged 602 with the opposite end from which the first cover is hinge-engaged. Accordingly, the first cover 501 and the second cover 502 may move from both ends of the support 400 toward the center portion, and in a state where the covers 501, 502 are closed, the first cover 501 and the second cover 502 may come in contact with each other near the center portion of the support 400. The first cover 501 and the second cover 502 may have equal lengths, and if desired, the lengths thereof may be extended or shortened. That is, it is enough if the sum of the lengths of the first cover and the second cover becomes equal to the length of the quantum dot bar to cover the whole quantum dot bar when the cover is closed, and according to circumstances, the lengths can be appropriately modified.

Figure 14:
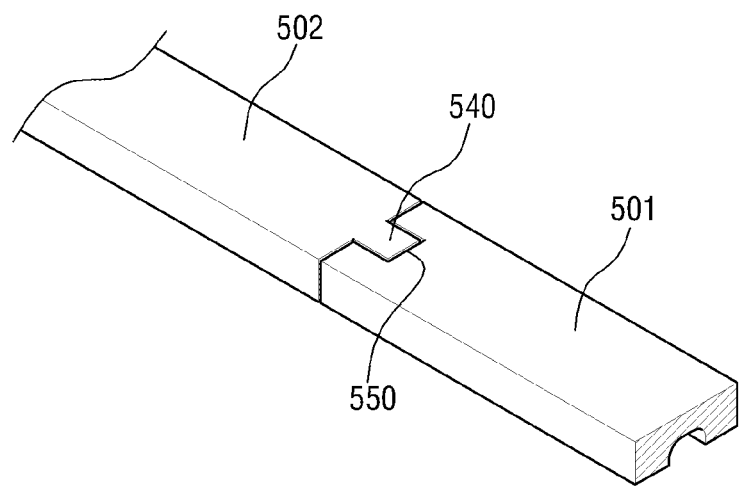
FIG. 14 is an enlarged perspective view of a fixing portion of a quantum dot bar container according to still another embodiment of the present invention.

FIG. 14 is an enlarged perspective view of the fixing portion of FIG. 13. As shown in FIG. 14, the fixing portions 540 and 550 may be concavo-convex engaged by concavo-convex portions 540 and 550 formed on the first cover 501 and the second cover 502. The positions of the concavo-convex portions 540 and 550 formed on the first cover 501 and the second cover 502 may be changed (e.g., may be reversed), and are not limited to the configuration shown.

Figure 15:
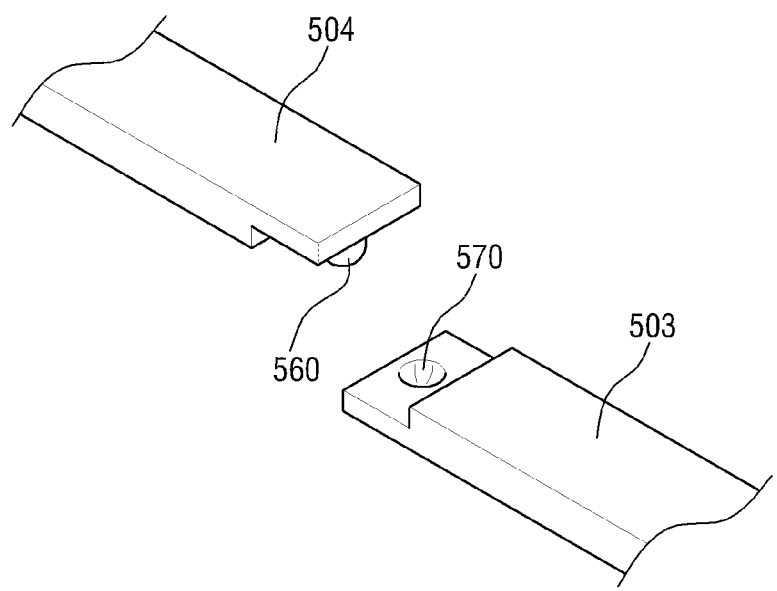
FIG. 15 is an enlarged perspective view of a fixing portion of a quantum dot bar container according to still another embodiment of the present invention.

As illustrated in FIG. 15, the fixing portions may be engaged with each other by a fixing projection 560 and a fixing recess or groove 570 formed on the first cover 503 and the second cover 504, and the fixing projection 560 may be composed of an elastic member. Accordingly, if a force is applied to the first cover 503 and the second cover 504, the fixing projection 560 is inserted into the fixing groove 570 to affix the covers 503 and 504 together. FIG. 15 illustrates that the fixing projection 560 is formed on the second cover 504. However, the fixing projection may be formed on the first cover 503 instead, and is not limited to the configuration shown.

Although not illustrated in the drawing, the first cover 503 and the second cover 504 may include a first base and a second base for separating the support 400 from the first and second covers 503, 504, and the first base and the second base may include shapes that have bent or curved surfaces facing the support 400. That is, the first base and the second base have the same or similar structures and functions as the base 620 of the quantum dot bar container as described above with reference to FIG. 5, except that the bases are formed on both covers 503, 504, and thus the detailed description thereof will be omitted.

A first angle maintenance portion and a second angle maintenance portion (which each can be similar to angle maintenance portion 610 described above) may be further formed between the first and second bases and the support, to maintain the open states of the first cover 503 and the second cover 504. The first angle maintenance portion and the second angle maintenance portion may be composed of elastic members.

Referring again to FIG. 13, the support 400 may further include a stopper 700 that is formed to project from the upper surface of the support 400, near a side of the guide groove 430. Also present may be a fixture (not illustrated) that projects from the surface opposite to the surface on which the guide groove 430 is formed. The stopper 700 and the fixture have the same functions as the stopper 700 and the fixture 450 of the quantum dot bar container as described above with reference to FIG. 5, and thus the detailed description thereof will be omitted.

Figure 16:
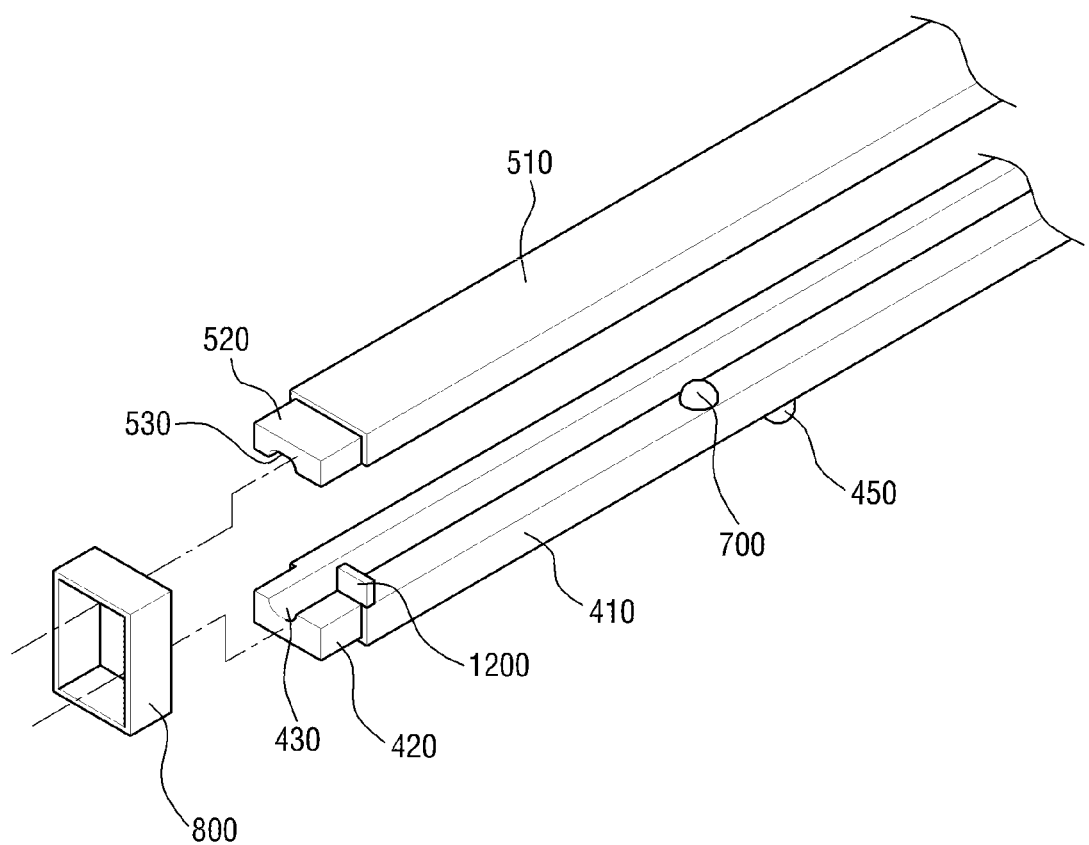
FIG. 16 is a perspective view of a quantum dot bar container according to still another embodiment of the present invention.

Referring to FIG. 16, the quantum dot bar container according to the present invention may further include light guide plate guide portions 1200 formed at both ends of the support 400, and the light guide plate guide portions 1200 may be formed to be spaced apart from each other at a distance approximately equal to the length of the side surface of the light guide plate. FIG. 16 illustrates that the light guide plate guide portion 1200 is formed at only one side surface of the support 400. However, the remaining light guide plate guide portion 1200 may be formed at the opposite end of support 400, such as near hinge 600, to maintain the light guide plate in an accurate position.

Figure 17:
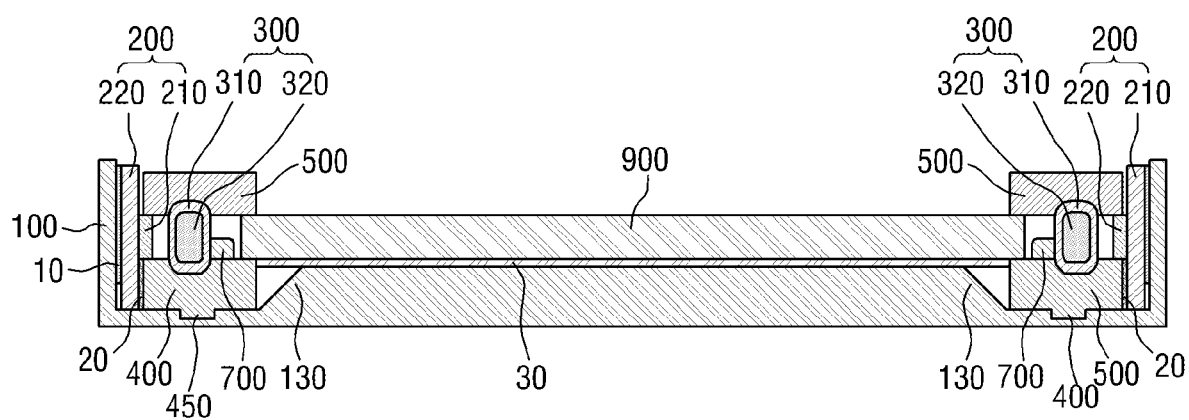
FIG. 17 is a cross-sectional view of a backlight unit according to another embodiment of the present invention.

Alternatively, multiple quantum dot bar containers may be employed within a single backlight unit. For example, one quantum dot bar container may be arranged on one side wall portion of the lower chassis 100 while others may be located along both side surfaces of the lower chassis 100 to face each other. FIG. 17 illustrates one such configuration.

Figure 18:
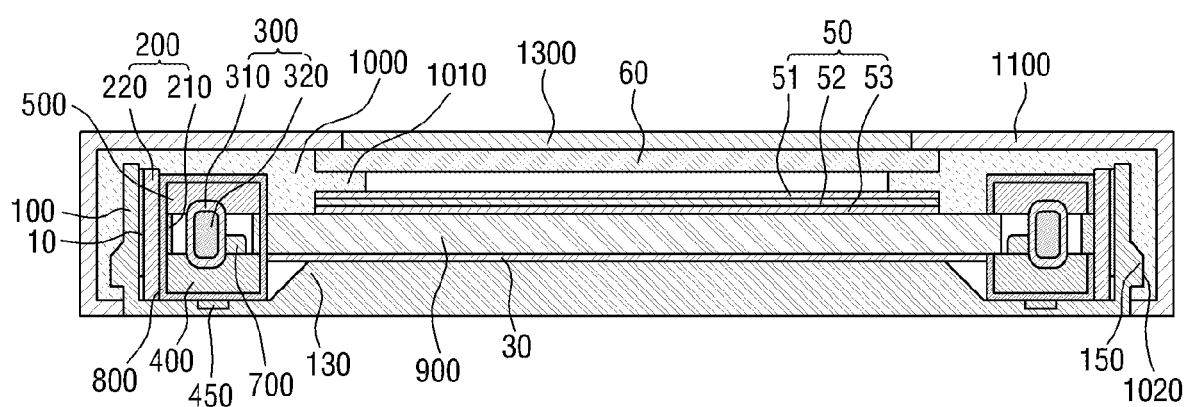
FIG. 18 is a cross-sectional view of a liquid crystal display according to an embodiment of the present invention.
Figure 19:
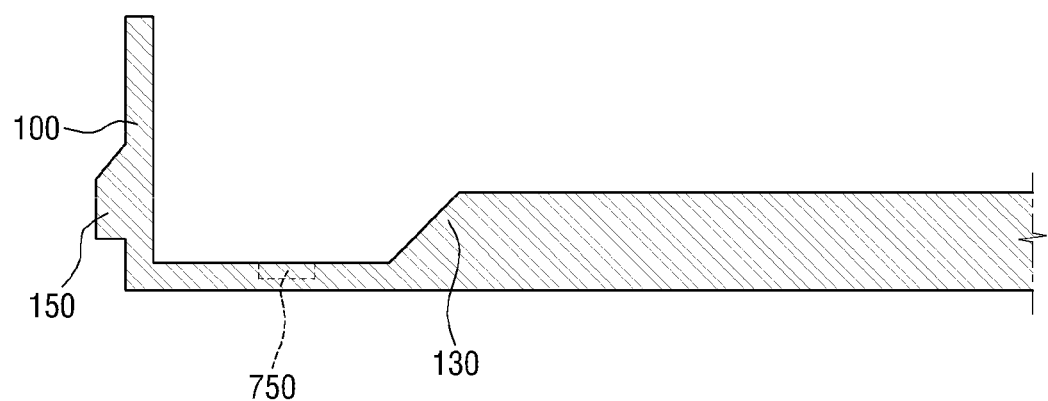
FIGS. 19 to 25 are cross-sectional views explaining a process of manufacturing a backlight unit according to an embodiment of the present invention.
Figure 20:
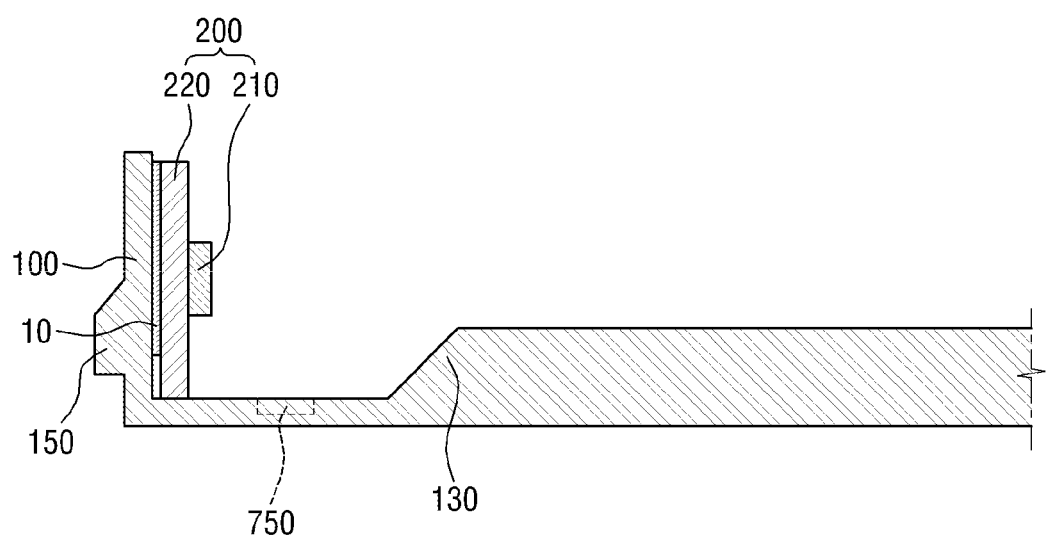
Figure 21:
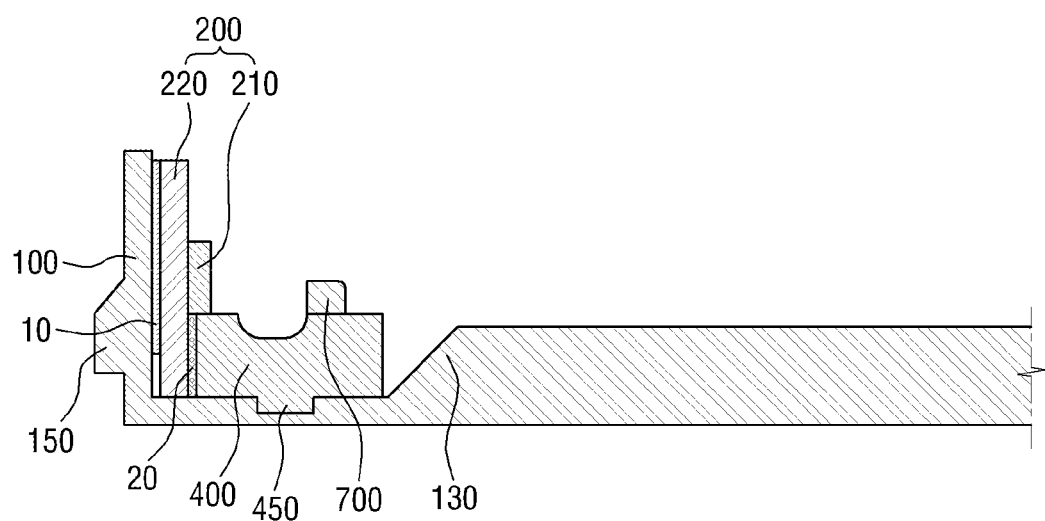
Figure 22:
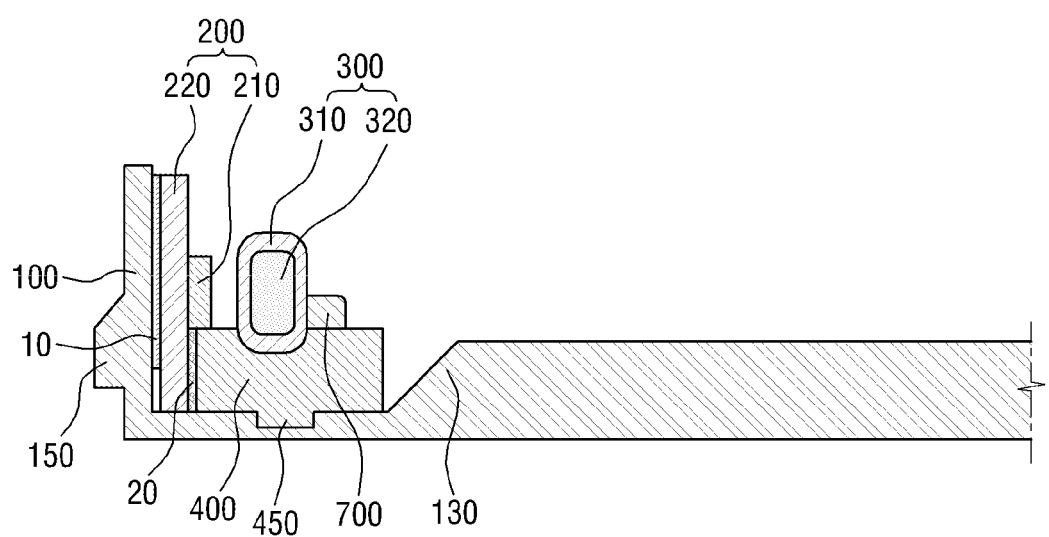
Figure 23:
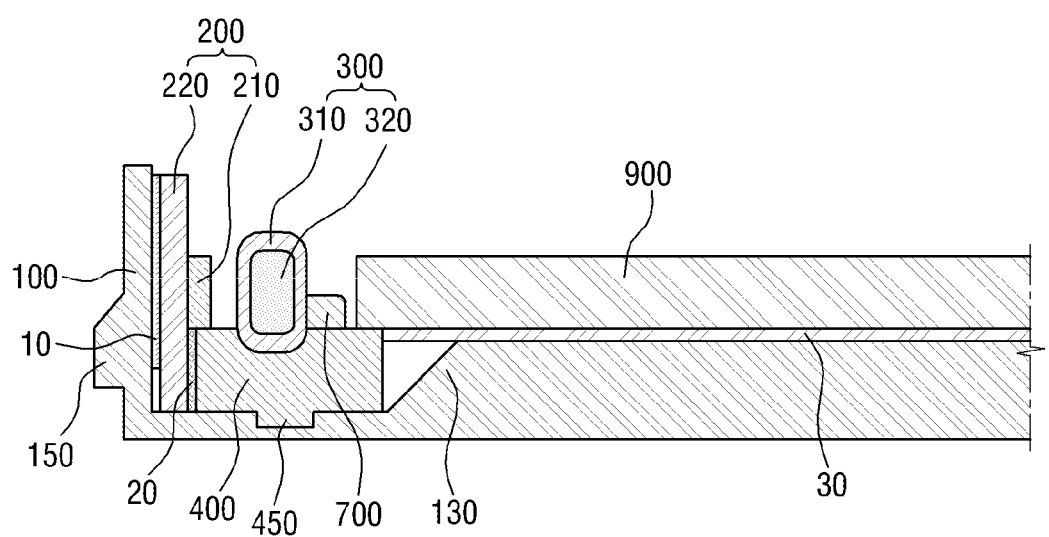
Figure 24:
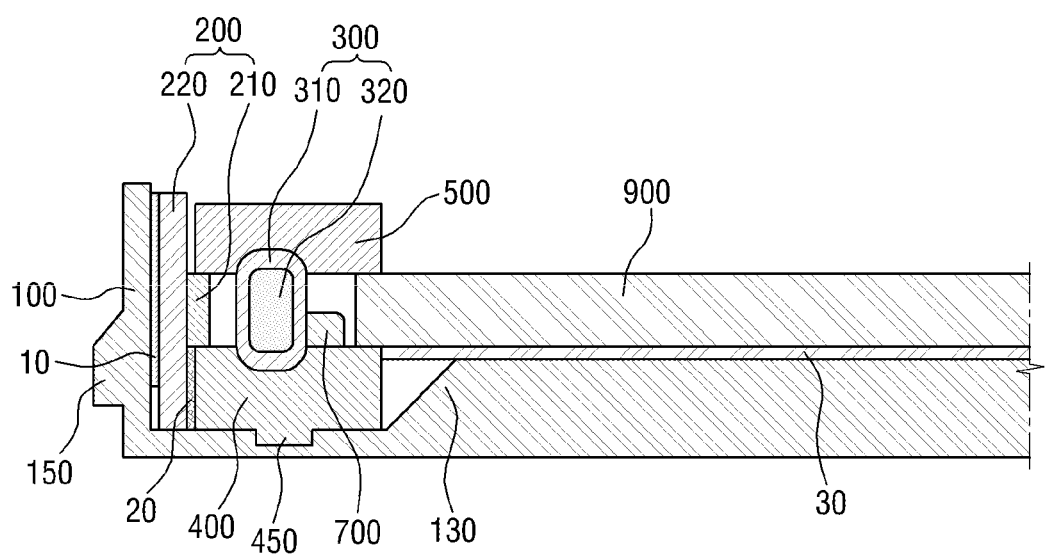
Figure 25:
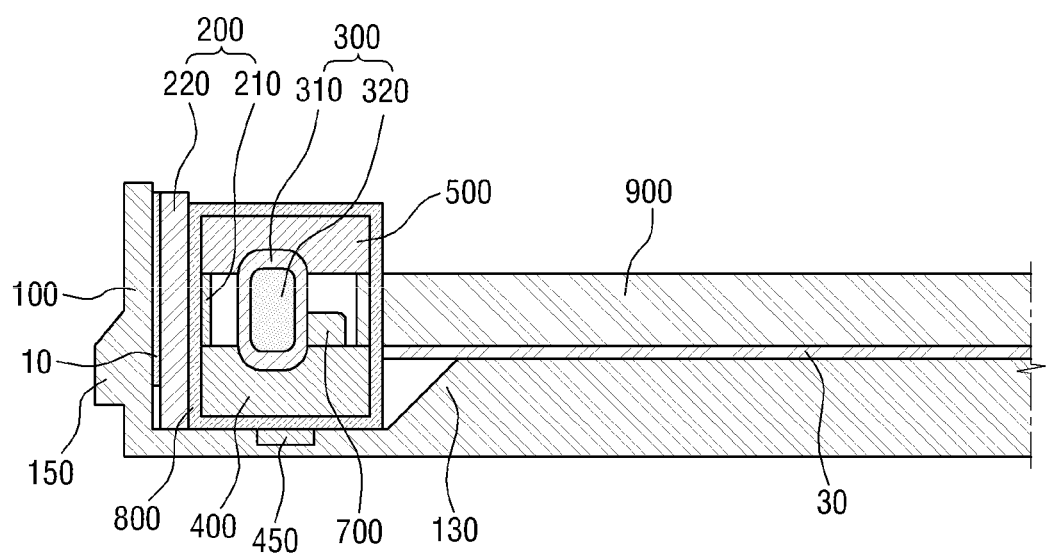

FIG. 18 is a cross-sectional view of a liquid crystal display according to an embodiment of the present invention. A liquid crystal display may include a backlight unit such as any of those described above.

As illustrated in FIG. 18, the liquid crystal display may include optical sheets 50, such as a diffusion film 53, a prism film 52, and a protection film 51, which are stacked on the upper portion or surface of the light guide plate 900 to improve the optical performance of the liquid crystal display. The diffusion film 53 diffuses the light that comes out from the light guide plate 900 and supplies the diffused light to a liquid crystal panel 60. The prism film 52 operates to collect the light that is diffused by the diffusion film in a direction that is perpendicular to the plane of the liquid crystal panel 60. On the other hand, in addition to the diffusion film 53 and the prism film 52, a micro lens array film (not illustrated) may be used. Any other configurations are also contemplated. For example, two diffusion films or two prism films may be used. Further, if needed, the arrangement of the optical films can be appropriately modified by those of ordinary skill in the art.

An intermediate frame 1000 may be stacked to cover the side wall portions 110 of the lower chassis 100, the light source 200, and the quantum dot bar container, and the liquid crystal panel 60 may be seated on the intermediate frame 1000. A top chassis 1250, which covers a part of the liquid crystal panel 60 and includes a window 1300, may be stacked on the upper portion of the liquid crystal panel 60. Although not illustrated, the liquid crystal panel 60 may include a liquid crystal layer interposed between TFT substrates, a color filter substrate, a polarizing filter, and a driving IC, and may function to display an image through adjustment of the strength of light that is incident from the liquid crystal panel. Since the details of such a liquid crystal panel are well known in the art, a detailed description thereof will be omitted.

Hereinafter, referring to FIGS. 19 to 25, a process of manufacturing a liquid crystal display according to the present invention will be described.

A light source 200 including an LED 210 mounted on a printed circuit board 220 may be attached to one side wall portion of a lower chassis 100, which includes a fixing hole 750 that corresponds to a fixture of a quantum dot bar container, using a heat-resistant tape. Next, the quantum dot bar container, in which a support 400 and a cover 500 are hinge-engaged (not illustrated), is fixedly engaged with the fixing hole 750 that is formed on the bottom surface of the lower chassis 100, and contact surfaces of the printed circuit board 220 and the support 400 may be attached to each other using a double-sided tape 20. Next, a quantum dot bar 300 is seated on a guide groove 430 of the support 400, and then a reflection sheet 30 and a light guide plate 900 may be seated on a seat portion 130 of the lower chassis 100 and the support 400.

Next, the quantum dot bar container is covered by the cover 500, and then the support 400, the cover 500, and the light guide plate 900 are fixed to each other by a fixing portion 800.

Although not illustrated in the drawing, other optical sheets may be put on the light guide plate, and an intermediate frame, the liquid crystal panel, and the top chassis are successively arranged to manufacture the liquid crystal display.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. The various features of the embodiments can be mixed and matched in any combination, so as to produce further embodiments contemplated by the invention.

What is claimed is:

1. A quantum dot bar container comprising:
   a support including a guide groove formed along a major axis thereof;
   a cover having a major axis, the cover being orientable to align its major axis substantially parallel to the major axis of the support, the cover including a fixing groove formed along the major axis of the cover so as to face the guide groove; and
   a fixing portion coupling an end of the support to an end of the cover,
   wherein the cover and the support are positioned so as to form a window therebetween, when the cover is oriented so that its major axis is substantially parallel to the major axis of the support, and
   wherein the cover is connected to at least one end of the support by a hinge.

2. The quantum dot bar container of claim 1, wherein the fixing portion comprises a band cap having an empty space formed therein.

3. The quantum dot bar container of claim 1, wherein the fixing portion comprises a hook.

4. The quantum dot bar container of claim 1, wherein the fixing portion comprises an elastic projection and a hole positioned and sized to accommodate the elastic projection therein.

5. The quantum dot bar container of claim 1, wherein the cover comprises a base for separating the support and the cover from each other, and
   the base extends from the cover toward the support.

6. The quantum dot bar container of claim 5, wherein the base includes a curved surface extending toward the support.

7. The quantum dot bar container of claim 5, further comprising an angle maintenance portion formed between the base and the support and positioned to contact the base so as to maintain an open state of the cover.

8. The quantum dot bar container of claim 1, wherein the support further comprises a stopper positioned proximate to the guide groove and extending from a surface of the support.

9. The quantum dot bar container of claim 1, wherein the support further comprises a fixture projecting from a surface that is opposite to the surface from which the guide groove extends.

10. A quantum dot bar container comprising:
    a support including a guide groove formed along a major axis thereof;
    a first cover and a second cover each having a major axis, each cover being orientable to align its major axis substantially parallel to the major axis of the support, each cover including a fixing groove formed along the major axis of its cover so as to face the guide groove; and
    fixing portions coupling the first and second covers to each other when the first and second covers are oriented so that their major axes are substantially parallel to the major axis of the support,
    wherein the first and second covers and the support are positioned so as to form a window between the covers and the support, when the covers are oriented so that their major axes are substantially parallel to the major axis of the support,
    wherein the cover is connected to at least one end of the support by a hinge.

11. The quantum dot bar container of claim 10, wherein the fixing portions are shaped and positioned to engage each other through a concavo-convex engagement.

12. The quantum dot bar container of claim 10, wherein the fixing portions couple the first cover to the second cover according to an engagement of an elastic projection with a hole sized and positioned to accommodate the elastic projection therein.

13. The quantum dot bar container of claim 10, wherein the first cover and the second cover comprise a first base and a second base for separating the first and second covers from the support, and
    the first base and the second base each extend toward the support.

14. The quantum dot bar container of claim 13, further comprising a first angle maintenance portion and a second angle maintenance portion formed between the first and second bases and the support and positioned to contact their respective bases to maintain open states of the first cover and the second cover.

15. A backlight unit comprising:
    a light source;
    a light guide plate configured to guide light from the light source to a front liquid crystal panel;
    a quantum dot bar arranged between the light source and the light guide plate to convert light from the light source into white light; and
    a quantum dot bar container accommodating the quantum dot bar and supporting a surface of the light guide plate,
    wherein the quantum dot bar container includes a support and a cover arranged to face each other, and a fixing portion coupling the support to the cover, the support and the cover including grooves shaped to accommodate an outer surface of the quantum dot bar,
    wherein the cover is connected to at least one end of the support by a hinge.

16. The backlight unit of claim 15, further comprising a lower chassis accommodating the light source, the light guide plate, the quantum dot bar, and the quantum dot bar container,
    wherein the lower chassis includes a seat portion seating the light guide plate at a height substantially equal to a height of the support.

17. The backlight unit of claim 16, wherein the support comprises a fixture extending between the support and the lower chassis,
    wherein the lower chassis includes a fastening hole accommodating and fastening the fixture.

18. The backlight unit of claim 17, wherein the lower chassis comprises a plurality of fastening holes that are arranged to be spaced apart from each other.

19. The backlight unit of claim 15, further comprising light guide plate guide portions extending from the support,
  wherein one of the light guide plate guide portions is positioned proximate to a first end of the light guide plate, and the other one of the light guide plate portions is positioned proximate to a second end of the light guide plate, the first end of the light guide plate being opposite to the second end of the light guide plate.

20. The backlight unit of claim 15, wherein the light source and the quantum dot bar are arranged to be spaced apart from each other.

\* \* \* \* \*